United States Patent [19]
Onorato et al.

[11] Patent Number: 5,102,739
[45] Date of Patent: Apr. 7, 1992

[54] LOW TEMPERATURE, AQUEOUS AMMONIA TREATMENT FOR POLYCARBONATE SUBSTRATES AND OPTICAL INFORMATION MEDIA EMPLOYING SAME

[75] Inventors: Frank J. Onorato, Phillipsburg; David E. Nikles, Colonia; Leroy McKenzie, Essex County; Jeffrey A. Schneider, Flemington, all of N.J.

[73] Assignee: Hoechst Celanese Corp., Somerville, N.J.

[21] Appl. No.: 487,340

[22] Filed: Mar. 1, 1990

[51] Int. Cl.$^5$ .............................................. B32B 9/00
[52] U.S. Cl. .................................. 428/412; 428/409; 427/163; 427/164
[58] Field of Search .................... 428/412, 409, 64; 427/163, 164

[56] References Cited
FOREIGN PATENT DOCUMENTS
0045059 3/1982 Japan ................................. 428/412

Primary Examiner—Patrick J. Ryan
Assistant Examiner—Elizabeth Evans
Attorney, Agent, or Firm—P. S. Kalyanaraman

[57] ABSTRACT

Provided is a method for preparing an optical information medium which comprises a polycarbonate substrate. A polycarbonate substrate is subjected to an aqueous ammonia solution treatment at a temperature below ambient temperatures and for an extended period of time. This treatment occurs prior to assembly of the optical information medium. Use of the treated polycarbonate substrate in the optical information medium results in the medium exhibiting a high level of performance over an extended useful life.

19 Claims, 4 Drawing Sheets

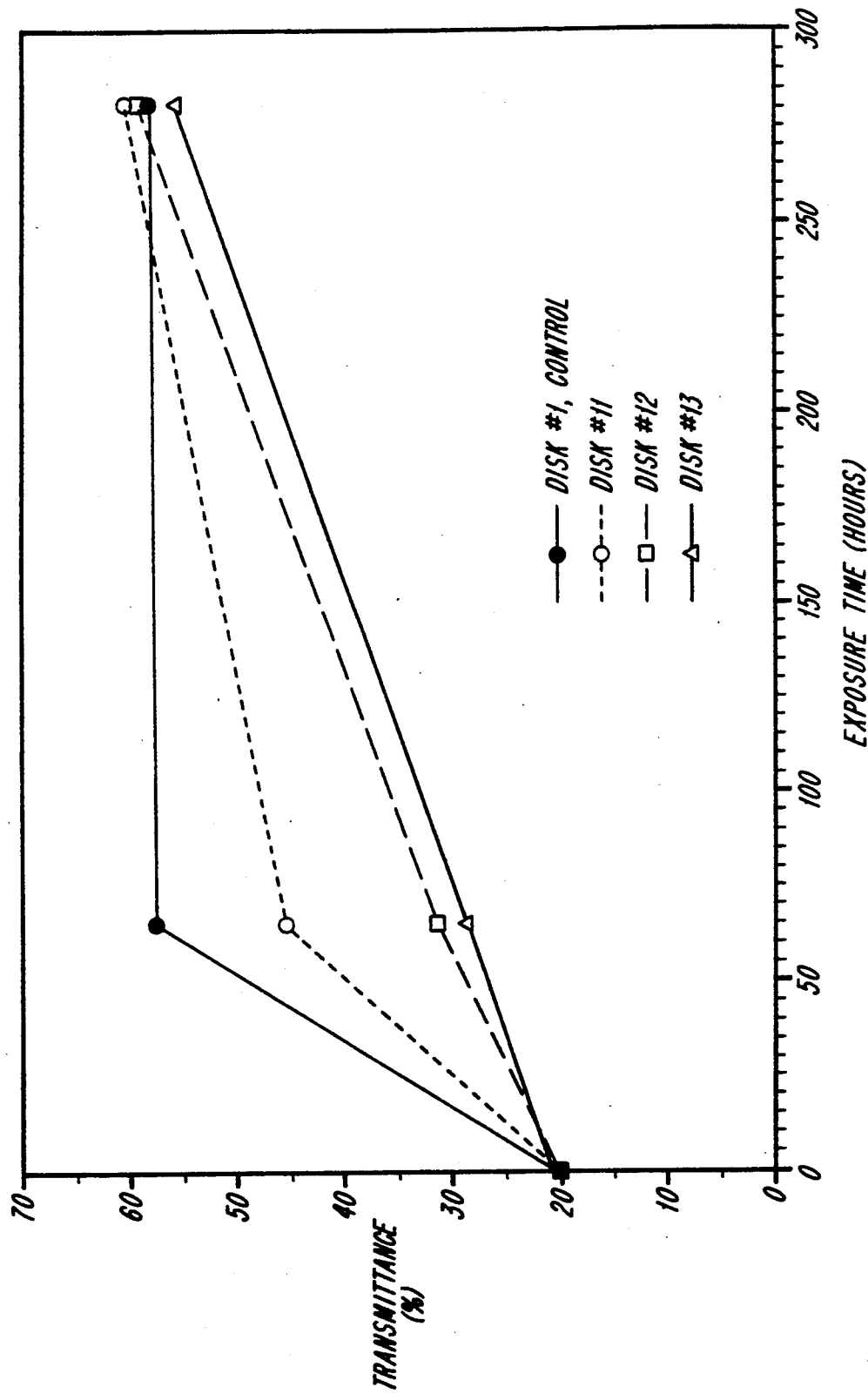

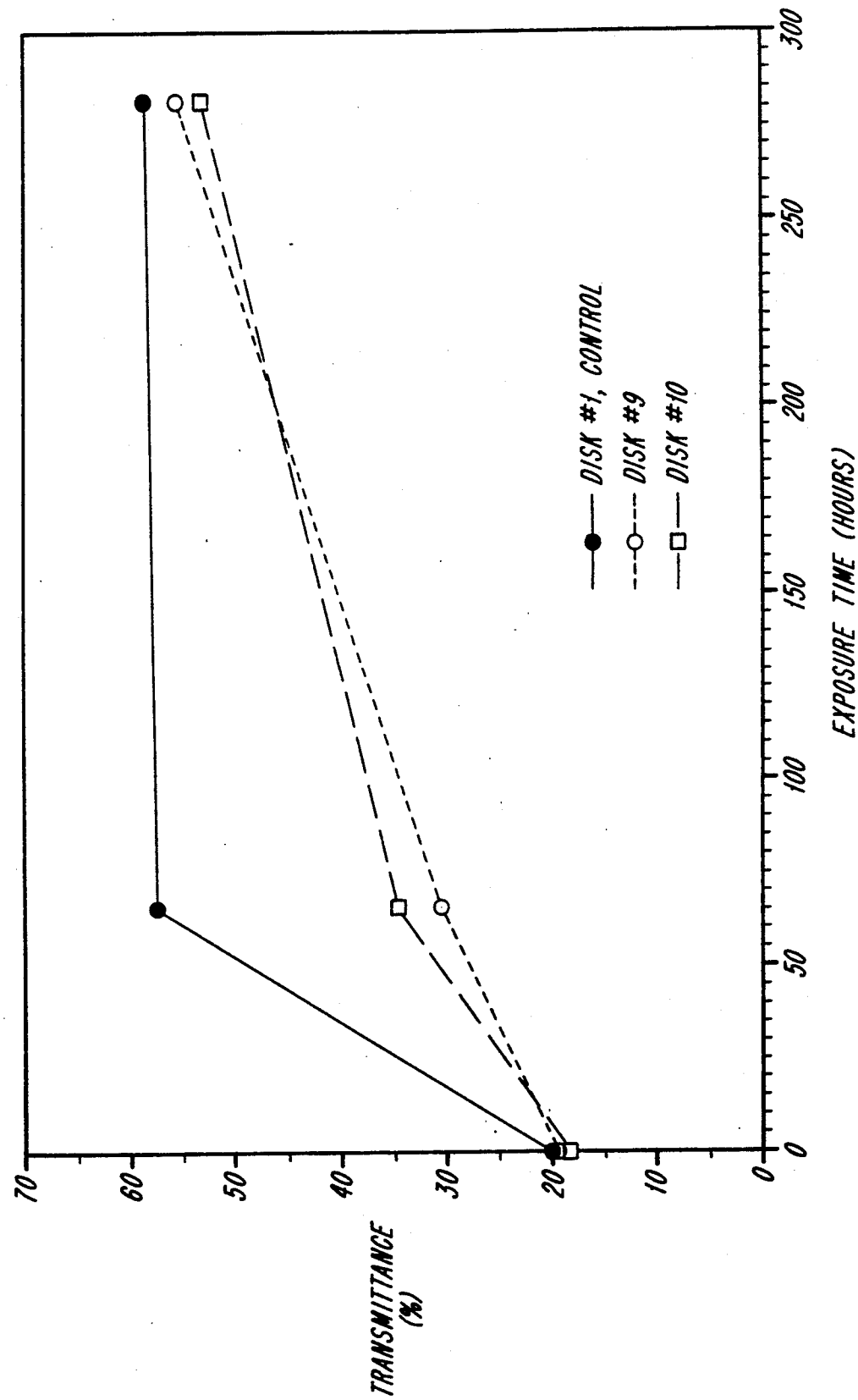

LOW TEMPERATURE, AQUEOUS AMMONIA TREATMENT FOR POLYCARBONATE SUBSTRATES AND OPTICAL INFORMATION MEDIA EMPLOYING SAME

BACKGROUND OF THE INVENTION

The present invention relates to a process for improving the overall lifetime of optical recording media. More particularly this invention relates to a process for stabilizing optical information storage media containing polycarbonate substrates.

Typical substrate materials used in the manufacture of optical recording media include acrylic resins, methacrylic resins, polystyrene resins, polycarbonate resins, cellulose resins, polyester resins, polyamide resins, polyolefin resins, epoxy resins, polyimide resins, cellulose triacetate, cellulose acetate butylate, polymethylpentene, and polyethylene terephthalate. Among the most preferred substrates are the polycarbonate substrates, due to their excellent optical properties and physical stability. Despite the excellent properties of the substrate per se, however, degradation of the optical properties of the optical information medium over time, for whatever reason, can cut short the useful lifetime of the optical information medium in which the substrate is incorporated. Many different and complicated technologies have been used in an attempt to solve this problem and thereby extend the useful life of a medium.

For example, U.S. Pat. No. 4,571,314 to Suzuki et al discloses a process for producing a substrate for optical recording media which comprises coating at least one inner surface of a casting mold with a radiation-curable or thermosetting resin. The resin is then cured to form a coating film on the mold surface or surfaces. An epoxy resin composition comprising an alicyclic epoxy resin or a mixture of an alicyclic epoxy resin and an aromatic epoxy resin, an organic polybasic acid anhydride, a curing accelerator and an anti-discoloring (antioxidative) agent is then cast into the mold and heat-cured to transfer the coating film on the mold to the surface of the cured product of the epoxy resin composition, thereby forming a double or triple layer cast laminate. This process is alleged to provide a physically stable and scratch-resistant substrate more reliably than the more conventional process of first molding a polymethylmethacrylate or polycarbonate sutstrate and subjecting same to a surface-hardening treatment.

Other methods for increasing the chemical and mechanical stability of an optical disk structure have included the use of a protective layer (Japanese Pat. Application Laid Open Nos. 57-60542 and 57-66541), and the use of a complicated "sandwich structure".

Because of the potential value of stable optical information media, and in particular stable optical information media containing polycarbonate substrates, it would be advantageous if improved stability, in terms of extended useful life of the media, could be realized easily and inexpensively without the need for complicated and expensive structures, reaction steps or chemical treatments.

Accordingly, it is an object of the present invention to provide a simple and commercially viable method for improving the stability of optical information media using polycarbonate substrates.

Another object of the present invention is to provide an optical information storage medium exhibiting improved overall lifetime stability.

It is yet another object of the present invention to provide a process for preparing an optical information storage medium comprising a polycarbonate substrate which exhibits a longer useful life and which also exhibits excellent performance over time.

These and other objects, as well as the scope, nature, and utilization of the invention, will be apparent to those skilled in the art from the following description, the Drawing and the appended claims.

SUMMARY OF THE INVENTION

In accordance with the foregoing objectives, there is provided a novel method for stabilizing an optical information medium, e g., optical disk, containing a polycarbonate substrate, which method comprises treating the polycarbonate substrate (prior to assembly into the medium) with an aqueous ammonia solution at a temperature below ambient temperatures, and preferably in the range of from about 8° C. to about 14° C.

In another embodiment of the present invention, there is provided an optical information storage medium possessing enhanced lifetime stability, which is prepared by coating a polycarbonate substrate material treated in accordance with the present invention with a suitable optical recording material. The improved stability exhibited by the optical information medium enhances the desirability and commercial viability of the optical information medium overall by extending its useful life.

BRIEF DESCRIPTION OF THE DRAWINGS

FIG. 3 is a graphical representation of % transmittance measurements made for optical information media subjected to an accelerated aging environment, with the treatment of the polycarbonate substrates incorporated into the media of the present invention having been at 12° C.

FIG. 4 is a graphical representation of % transmittance measurements made for optical information media subjected to an accelerated aging environment, with the treatment of the polycarbonate substrates incorporated into the media of the present invention having been at 14° C.

DETAILED DESCRIPTION OF THE PREFERRED EMBODIMENTS

Figure 1:
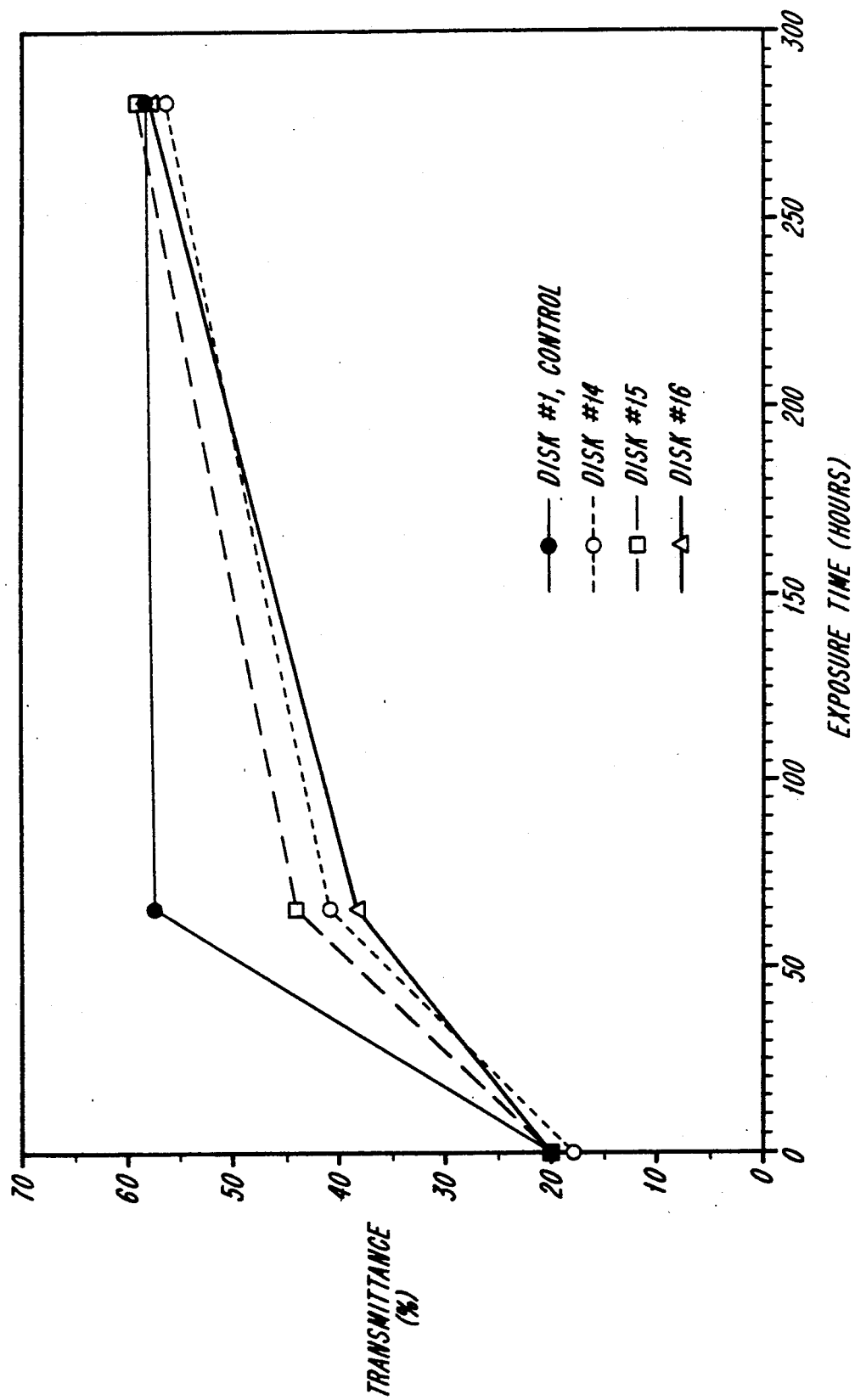
FIG. 1 is a graphical representation of % transmittance measurements made for optical information media subjected to an accelerated aging environment, with the treatment of the polycarbonate substrates incorporated into the media of the present invention having been at 8° C.

The simple, yet surprisingly effective substrate treatment of the present invention comprises soaking the polycarbonate substrate in an aqueous ammonia solution maintained at a temperature below ambient temperatures (i.e., below about 20°-25° C.). Most preferably, the substrate is placed in an aqueous ammonia bath where the bath temperature can be monitored and maintained at a specific temperature at below about 20°–25° C. It has been surprisingly found that when the treated polycarbonate substrate is subsequently used in an optical information medium, the medium exhibits an extended useful life as manifested in a delay of the onset of degradation in the reflectance and transmittance factors of the medium. Furthermore, no defects are introduced into the substrate by the treatment, thereby permitting a high level of performance to be realized.

The temperature and ammonia concentration of the aqueous ammonia solution is preferably such that stability is maximized through the treatment, however, the temperature must be such that the formation of surface defects in the polycarbonate substrate does not occur.

The preferred temperature for treatment of the polycarbonate substrate is below about 20° C., is more preferably at least 5° C. but below about 20° C., and most preferably in the range of from about 8° C. to about 14° C. The preferred ammonia concentration of the bath solution ranges from about 0.5 to about 10 weight percent, and more preferably ranges from 1 to about 3 weight percent.

The length of time which the polycarbonate substrate is treated should be such that stability has a chance to reach its maximum value under the selected conditions. Generally, the longer the treatment, the better the result. The length of time of the treatment is therefore controlled by the practical considerations of cost, time constraints, etc. In general, however, the treatment should be conducted for at least 45 minutes, more preferably for at least 100 minutes, and most preferably for 120 minutes or more.

The extent to which the optical information medium containing the treated polycarbonate substrate is stabilized through the aqueous ammonia treatment can be gauged by the effect on the transmission and reflection factors of the medium over time as measured under accelerated aging conditions. An increase in stability is reflected by a decelerated increase over time in the transmission factor(T) and/or a decelerated decrease over time in the reflection factor(R). A slowed change over time in the transmission and reflection factors indicates that the onset of degradation of the medium properties overall has been slowed. Slowing the degradation of the medium properties overall translates into a prolongation of the useful lifetime of the optical information storage medium. The overall increase in stability of the optical information storage medium can vary with temperature, concentration, and the length of time the substrate is treated in the aqueous ammonia solution.

The polycarbonate substrate treated in accordance with the present invention can be any polycarbonate containing base. The substrate can be made from a composition which is totally a polycarbonate, or a blend or copolymer of a polycarbonate and another polymer. For example, the polycarbonate can be blended with a polyvinyl aromatic polymer such as polystyrene, or can be copolymerized, for example, as in U. S. Pat. No.4,680,374. As well, the polycarbonate used in preparing the substrate can be chemically modified in various manners, e. g. , by the addition of functional groups to the polymer chain, as long as the functional groups do not adversely react during the aqueous ammonia treatment. Additives, such as antioxidants, can also be used to supplement the polycarbonate in forming the substrate.

The most preferred type or grade of polycarbonate for use as the substrate in an optical recording medium is a "CD grade" polycarbonate, which is well recognized in the industry. See, e. g. , "Molding Compounds for Optical Disk Substrates" by Kato et al, SPIE, Vol. 695, Optical Mass Data Storage II (1986). This grade of polycarbonate has particularly desirable optical properties, including excellent optical transmittance and a capability to provide molded objects with low birefringence. Commercially such grades of polycarbonate are available under the mark LEXAN and MARKOLON from General Electric and Mobay respectively.

The substrate materials may be provided with a tracking groove for guiding the laser beam. The groove can be generated by any conventional method known in the art, but is preferably generated upon injection molding of the substrate. It is a preferred embodiment of the present invention to use a pre-grooved substrate.

Materials for forming the recording layer can be any of the conventional organic or inorganic materials. Organic materials are generally superior to metallic materials in respect to ease of application, as well as oxygen-resistance and stability, and are therefore preferred. Among the organic materials, naphthalocyanine, phthalocyanine, porphyrin, anthracyanine, and phenanthracyanine chromophores are particularly preferred because of their absorbance, and chemical and photolytic stability. Any appropriate naphthalocyanine, phthalocyanine, anthracyanine, or phenanthracyanine chromophore which is known in the art may be used, with the most preferred chromophore being a naphthalocyanine chromophore, particularly a silicon naphthalocyanine chromophore. Such chromophores which provide a smooth, homogeneous, defect-free, no-noise film upon casting on a substrate are of particular preference.

It is possible to use the chromophore in preparing the information layer alone or in combination with a suitable and film-forming polymer. A combination of the chromophore and film-forming polymer requires that the chromophore be dissolved in a solvent together with the polymer and cast together as a film on the surface of the treated substrate. The film must provide a very flat surface in order to successfully be a recording layer and avoid errors and noise. In order to facilitate the coating procedure for a polymer/chromophore combination, it is generally advantageous that the polymer and chromophore be soluble in a readily available organic solvent such as an alcohol or ketone. Also, upon evaporation of the solvent, the chromophore should not precipitate in a particulate form, which particulates would cause a scattering of light. It is preferred to use a chromophore which is self-casting and cast the chromophore layer without a film-forming polymer, although the polycarbonate substrate can be successfully coated with a polymer/chromophore film.

Any suitable coating technique may be used to obtain the recording layer, with a conventional technique such as spin coating, which allows for a high degree of control of film thickness and flatness, being preferred. It is, of course, important that a thin film coating be formed.

The polycarbonate substrate which is coated should generally possess a surface of suitable smoothness. This may be imparted by appropriate molding or other forming techniques when the substrate is made. If the substrate has an inadequately smooth surface, a smoothing or subbing polymer layer may be used to attain the appropriate smoothness. Such a smoothing or subbing layer should not, of course, interfere with application or utilization of the recording layer which is subsequently applied thereto. The subbing layer can contain preformatting information.

A suitable protective layer or cover, such as those known to the art, can also be used if desired to protect the recording layer form dirt, dust, scratches or abrasion.

A pair of the thus fabricated recording mediums can also be superimposed in such a manner that each recording layer comes to face each other so as to form an air space therebetween, thereby constructing a sealed air-sandwich type recording medium. Alternatively, a sealed sandwich type recording medium can be constructed by tightly sealing a pair of the recording mediums with the above-mentioned protective layer interposed therebetween.

The following examples are given to illustrate the aqueous ammonia treatment process of the present invention and the advantageous effects of the treatment process as manifested in the optical properties of the optical information media containing the treated polycarbonate substrates. It is understood that the following examples are given by way of illustration and are not meant to limit the disclosure or the claims to follow. All percentages mentioned in the examples below, and elsewhere in the specification, are by weight unless otherwise specified.

COMPARATIVE EXAMPLE 1

An aqueous ammonia treatment solution was prepared by placing 114 ml. of ammonia and 3686 ml. of distilled water in a one-gallon bottle. This combination resulted in a 3 weight percent aqueous ammonia solution. The solution was then mixed at room temperature using a magnetic stirrer. After the solution was stirred, it was poured into a soak tank so that the polycarbonate optical disk substrates could be treated therein.

Three pairs of pre-grooved polycarbonate substrates were placed in the soak tank at room temperature for 30, 45, and 60 minutes, respectively and allowed to soak at room temperature (about 24° C.). Following the aqueous ammonia treatment, the polycarbonate substrates were rinsed with distilled water for approximately 2 minutes each and allowed to dry in an almost pure nitrogen environment.

The treated polycarbonate substrates were then examined under an optical microscope and were found to have large surface defects. These defects are believed to have resulted from an attack of ammonia on the polycarbonate substrate. The presence of these defects in the substrate are unacceptable as they would lead to bit errors and tracking errors in the final optical storage medium.

A second aqueous ammonia solution with a 1.6 weight percent ammonia concentration was prepared by placing 1900 ml. of the 3 weight percent ammonia solution in a one-gallon bottle and adding thereto 3646.5 ml. of distilled water. The 1.6 weight percent ammonia solution was mixed at room temperature using a magnetic stirrer. After the solution was stirred, it was poured into a soak tank and three pairs of pre-grooved polycarbonate substrates were placed in the soak tank solution for 70, 110, and 150 minutes, respectively, and allowed to soak at room temperature (about 24° C.). Following the aqueous ammonia treatment, the polycarbonate substrates were rinsed with distilled water for approximately 2 minutes each and allowed to dry in an almost pure nitrogen environment.

These polycarbonate substrates were also examined under an optical microscope, and were also found to have large, unacceptable surface defects.

EXAMPLE 1

The effect of temperature on the aqueous ammonia treatment process was tested as follows.

First, 1900 ml. of distilled water were added to 1900 ml. of a 3% aqueous ammonia solution to create a 1.5% ammonia concentration. The solution was mixed at room temperature using a magnetic stirrer. After the solution was stirred, it was poured into a soak tank so that the optical disk substrates could be treated therein. The soak tank was connected to a "Haake" heating and circulating system to circulate the aqueous ammonia solution and to raise the temperature of the circulating 1.5% ammonia solution to approximately 39° C.

Three pairs of pre-grooved polycarbonate substrates were placed in the soak tank solution for 60, 90, and 210 minutes, respectively. Following the aqueous ammonia treatment, the polycarbonate substrates were rinsed with distilled water for approximately 2 minutes each and allowed to dry in an almost pure nitrogen environment. The treated polycarbonate substrates were examined under an optical microscope for surface defects.

A silicon naphthalocyanine chromophore was then spin coated onto the treated substrates and each pair of coated substrates was formed into an air-sandwich optical disk. The transmission and reflectance factors of the air-sandwich optical disks were measured and recorded. The disks were then placed in a controlled temperature/humidity chamber and subjected to an 80° C./80% relative humidity (RH) accelerated aging environment. The disks were aged in the chamber under the accelerated aging conditions for various lengths of time, during which the transmission and reflectance factors were periodically measured and recorded. The results of the various measurements are listed in Table 1 (Disk Nos. 17-19).

Second, several solutions with ammonia concentrations between 1 and 3 weight percent were prepared by adding the appropriate amounts of distilled water and ammonium hydroxide in a vessel and stirring the resulting solutions. After the solutions were stirred, they were poured into a soak tank so that polycarbonate optical disk substrates could be treated therein. The soak tank was immersed in an ice water bath and the aqueous ammonia solution was connected to a circulating pump which helped to maintain the temperature of the soak tank at a specified temperature ranging from about 8° C. to about 14° C.

Several sets of pre-grooved polycarbonate substrates were placed in the soak tank solutions for varying lengths of time. Several runs were made with the pump circulating the aqueous ammonia solution and several runs were made with no flow of the aqueous ammonia solution. Following the aqueous ammonia treatment, the polycarbonate substrates were rinsed with distilled water for approximately 2 minutes each and allowed to dry in an almost pure nitrogen environment. The disks were then examined under an optical microscope for any defects.

A silicon naphthalocyanine chromophore was then spin coated onto the treated substrates and each pair of coated substrates was formed into an air-sandwich optical disk. The transmission and reflectance factors of the air-sandwich optical disks were measured and recorded and the disks were then placed in a controlled temperature/humidity chamber and subjected to an 80° C./80% relative humidity accelerated aging environment. The disks were aged in the chamber under the accelerated aging conditions for various lengths of time, during which the transmission and reflectance factors were periodically measured and recorded. The results of the various measurements are listed in Table 1 (Disk Nos. 3-5 and 9-16).

Third, control runs were made in which no pretreatment took place (Disk Nos. 1 and 2) and runs were made in which the ammonia solution pretreatment was at room temperature (Disk Nos. 6-8). Prior to coating with the silicon napthalocyanine information layer, these disks were also examined under an optical microscope for any defects. The disks were then aged in the controlled temperature/humidity chamber as described above, with the reflectance and transmittance factors being measured periodically.

Table 1 displays the results of the runs described above. The first column of the table lists the optical disk no. and the flow conditions of the aqueous ammonia solution. The second and third columns list the ammonia concentration of the aqueous ammonia solution and the temperature of the aqueous ammonia solution, respectively, as used in the treatment of the polycarbonate substrate. The fourth column lists the length of time each disk was treated in the aqueous ammonia solution. The fifth column lists whether any defects were observed in the polycarbonate substrates under an optical microscope. The sixth column lists the length of time each disk was subjected to the 80° C./80% RH accelerated aging environment. The last two columns list the transmission and reflectance factors of each air sandwich disk as measured periodically and corresponding to the length of time under the accelerated aging conditions listed in the sixth column.

TABLE 1

| Disk No. | Concen. | Temp. | Time | Defects Observ. | Exp. Hrs. | % Trans. | % Reflec. |
|---|---|---|---|---|---|---|---|
| 1 control, no treatment | | | | No | 0.0 | 20.1 | 36.3 |
| | | | | | 65.9 | 57.7 | 23.4 |
| | | | | | 281.9 | 58.7 | 21.8 |
| 2 control, no treatment | | | | No | 0.0 | 19.5 | 37.4 |
| | | | | | 65.9 | 55.0 | 24.5 |
| | | | | | 281.9 | 60.9 | 23.2 |
| 3 (no flow) | 1.5% NH$_3$ | 10° C. | 75 min. | No | 0.0 | 19.6 | 37.9 |
| | | | | | 65.9 | 50.2 | 25.0 |
| | | | | | 281.9 | 57.7 | 22.1 |
| 4 (no flow) | 1.5% NH$_3$ | 10° C. | 90 min. | No | 0.0 | 20.1 | 37.7 |
| | | | | | 65.9 | 56.7 | 24.0 |
| | | | | | 281.9 | 59.7 | 22.2 |
| 5 (no flow) | 1.5% NH$_3$ | 10° C. | 115 min. | No | 0.0 | 19.2 | 38.4 |
| | | | | | 65.9 | 45.7 | 26.4 |
| | | | | | 281.9 | 58.7 | 22.0 |
| 6 (with flow) | 1.5% NH$_3$ | 24° C. | 75 min. | Yes | 0.0 | 20.2 | 38.3 |
| | | | | | 65.9 | 53.8 | 24.2 |
| | | | | | 281.9 | 60.4 | 21.9 |
| 7 (with flow) | 1.5% NH$_3$ | 24° C. | 170 min. | Yes | 0.0 | 19.9 | 38.6 |
| | | | | | 65.9 | 52.8 | 24.2 |
| | | | | | 281.9 | 60.1 | 21.7 |
| 8 (with flow) | 1.5% NH$_3$ | 24° C. | 200 min. | Yes | 0.0 | 19.7 | 39.8 |
| | | | | | 65.9 | 33.1 | 28.2 |
| | | | | | 281.9 | 60.4 | 21.6 |
| 9 (with flow) | 1.5% NH$_3$ | 14° C. | 60 min. | No | 0.0 | 19.1 | 39.2 |
| | | | | | 65.9 | 31.6 | 29.5 |
| | | | | | 281.9 | 55.5 | 22.6 |
| 10 (with flow) | 1.5% NH$_3$ | 14° C. | 95 min. | No | 0.0 | 18.6 | 39.7 |
| | | | | | 65.9 | 35.5 | 13.1 |
| | | | | | 281.9 | 53.2 | 23.6 |
| 11 (with flow) | 3.0% NH$_3$ | 12° C. | 55 min. | No | 0.0 | 20.0 | 39.4 |
| | | | | | 65.9 | 45.7 | 25.1 |
| | | | | | 281.9 | 60.6 | 21.9 |
| 12 (with flow) | 3.0% NH$_3$ | 12° C. | 130 min. | No | 0.0 | 20.0 | 39.8 |
| | | | | | 65.9 | 31.8 | 30.6 |
| | | | | | 281.9 | 59.6 | 21.9 |
| 13 (with flow) | 3.0% NH$_3$ | 12° C. | 240 min. | No | 0.0 | 20.8 | 39.1 |
| | | | | | 65.9 | 29.5 | 32.5 |
| | | | | | 281.9 | 56.3 | 22.5 |
| 14 (with flow) | 1% NH$_3$ | 8° C. | 75 min. | No | 0.0 | 18.2 | 40.1 |
| | | | | | 65.9 | 41.2 | 27.4 |
| | | | | | 281.9 | 56.7 | 23.3 |
| 15 (with flow) | 1% NH$_3$ | 8° C. | 90 min. | No | 0.0 | 20.2 | 38.9 |
| | | | | | 65.9 | 44.3 | 26.8 |
| | | | | | 281.9 | 59.3 | 22.9 |
| 16 (with flow) | 1% NH$_3$ | 8° C. | 115 min. | No | 0.0 | 20.7 | 38.9 |
| | | | | | 65.9 | 38.9 | 28.0 |
| | | | | | 281.9 | 58.3 | 22.7 |
| 17 | 1.5% NH$_3$ | 39° C. | 60 min. | Yes | 0.0 | 12.5 | 38.0 |
| | | | | | 192.0 | 17.2 | 35.0 |
| | | | | | 360.0 | 34.9 | 25.3 |
| | | | | | 552.0 | 52.4 | 23.9 |
| | | | | | 648.0 | 52.4 | 23.4 |
| 18 | 1.5% NH$_3$ | 39° C. | 60 min. | Yes | 0.0 | 13.2 | 37.5 |
| | | | | | 192.0 | 17.9 | 35.1 |
| | | | | | 360.0 | 26.8 | 28.5 |
| | | | | | 552.0 | 42.1 | 23.5 |

TABLE 1-continued

| Disk No. | Concen. | Temp. | Time | Defects Observ. | Exp. Hrs. | % Trans. | % Reflec. |
|---|---|---|---|---|---|---|---|
| 19 | 1.5% NH₃ | 39° C. | 60 min. | Yes | 628.0 | 42.1 | 23.5 |
|  |  |  |  |  | 0.0 | 13.7 | 38.6 |
|  |  |  |  |  | 192.0 | 19.0 | 35.6 |
|  |  |  |  |  | 360.0 | 24.5 | 30.1 |
|  |  |  |  |  | 552.0 | 32.9 | 26.4 |
|  |  |  |  |  | 648.0 | 32.9 | 26.4 |

As can be seen from the foregoing data, the ammonia treatment of the present invention significantly slows the increase in transmittance and decrease in reflectance of an optical information medium containing a treated polycarbonate substrate in accordance with the present invention, as compared to an optical information medium containing a polycarbonate substrate which has not been so treated. Moreover, when the ammonia treatment is conducted at a temperature below about 20° C., i.e., disks 3-5 and 9-16, surprisingly, no surface defects are encountered. When ammonia treatment is conducted at 24° C. or higher, i.e., disks 6-8 and 17-19, unacceptable surface defects arise in the polycarbonate substrate. Thus, by practicing the low temperature, ammonia solution treatment of the present invention, an optical recording medium containing a polycarbonate substrate is obtained having a high level of performance and an extended useful life.

Figure 2:
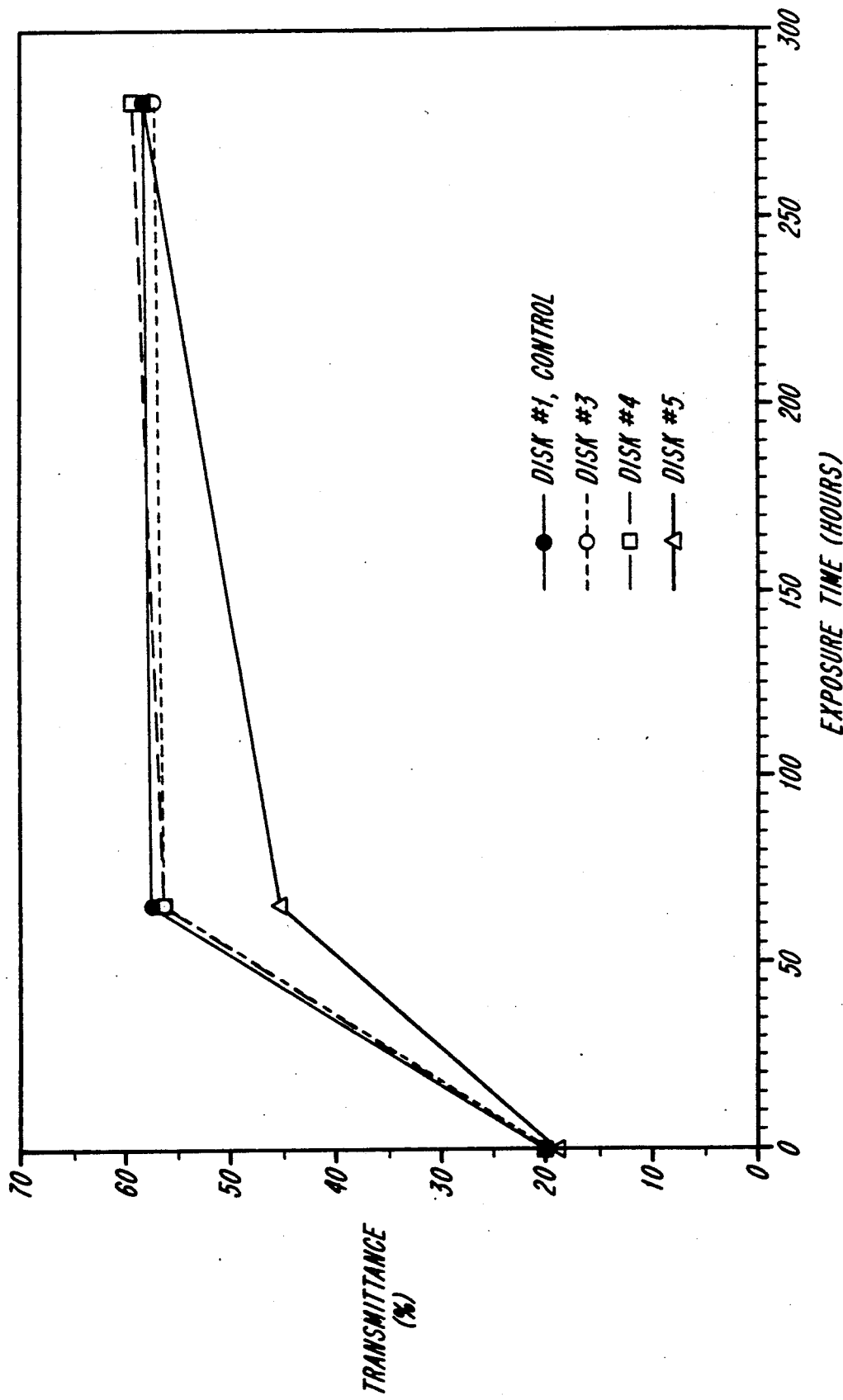
FIG. 2 is a graphical representation cf % transmittance measurements made for optical information media subjected to an accelerated aging environment, with the treatment of the polycarbonate substrates incorporated into the media of the present invention having been at 10° C.

The data of No. 1 control disk and disks 3-5 and 9-16 of Example 1 are plotted in FIGS. 1-4 of the Drawing. These graphical representations of the % transmittance observed clearly shows the advantages of the present invention.

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. An optical information medium comprising a polycarbonate substrate and an optical information layer, with the polycarbonate substrate having been immersed in an aqueous ammonia solution at a temperature below about 20° C. for a time period of at least 45 minutes, then rinsed with water, and dried, prior to coating of said information layer, said aqueous ammonia solution having an ammonia concentration of between about 0.5 and about 10 weight percent.

2. An optical information medium comprising a polycarbonate substrate and an optical information layer, with the polycarbonate substrate having been immersed in an aqueous ammonia solution at a temperature between about 8° C. and about 14° C. for a time period of at least 45 minutes, then rinsed with water, and dried, prior to coating of said information layer, said aqueous ammonia solution having an ammonia concentration of between about 1 and about 3 weight percent.

3. The optical information medium of claim 1 or claim 2, wherein said optical information layer comprises an organic material.

4. A method for preparing an optical information medium which comprises:
 (a) immersing a polycarbonate substrate in an aqueous ammonia solution at a temperature below about 20° C., for a time period of at least 45 minutes, said aqueous ammonia solution having an ammonia concentration of between about 0.5 and about 10 weight percent;
 (b) rinsing said polycarbonate substrate with water;
 (c) drying said polycarbonate substrate; and
 (d) coating said polycarbonate substrate with a suitable optical information layer.

5. The method of claim 4, wherein the substrate is immersed in the ammonia solution for at least 100 minutes.

6. The method of claim 4, wherein the substrate is immersed in the ammonia solution for at least 120 minutes.

7. The method of claim 4, wherein said optical information layer comprises an organic material.

8. The method of claim 4, wherein said optical information layer comprises a naphthalocyanine, phthalocyanine, anthracyanine, phenanthracyanine, orporphyrin chromophore.

9. The method of claim 4, wherein said optical information layer comprises a naphthalocyanine chromophore.

10. The method of claim 4, wherein said optical information layer is coated on said polycarbonate substrate by spin coating.

11. The method of claim 4, further comprising preparing a second optical information medium and superimposing the two fabricated optical information media to form an air space therebetween and form an air-sandwich type optical information storage medium.

12. The method of claim 4, wherein the temperature of said solution is at least about 5° C.

13. The method of claim 4, wherein the temperature of said solution is between about 8° C. and 14° C.

14. The method of claim 4, wherein the ammonia concentration of the aqueous ammonia solution is between about 1 to about 3 weight percent.

15. The method of claim 4, wherein a subbing layer is coated on the substrate prior to the optical information layer.

16. The method of claim 13, wherein the ammonia concentration of the aqueous ammonia solution ranges between about 1 and about 3 weight percent.

17. The method of claim 16, wherein the optical information layer comprises an organic material.

18. The method of claim 17, wherein the optical information layer comprises a naphthalocyanine, phthalocyanine, anthracyanine, phenanthracyanine, or porphyrin chromophore.

19. The method of claim 17, wherein said optical information layer comprises a naphthalocyanine chromophore.

* * * * *